United States Patent [19]
Bérubé

[11] Patent Number: 5,929,155
[45] Date of Patent: Jul. 27, 1999

[54] METHOD AND COMPOSITION FOR PROVIDING REPULPABLE MOISTURE VAPOR BARRIER COATING FOR FLEXIBLE PACKAGING

[75] Inventor: Serge Bérubé, Le Gardeur, Canada

[73] Assignee: Le Groupe Recherche I.D. Inc., Quebec, Canada

[21] Appl. No.: 08/588,724

[22] Filed: Jan. 19, 1996

Related U.S. Application Data

[63] Continuation-in-part of application No. 08/375,988, Jan. 20, 1995, abandoned.

[51] Int. Cl.⁶ .............................. C08J 5/10; C08K 3/26; C08L 27/08
[52] U.S. Cl. ........................................ 524/425; 524/524
[58] Field of Search ..................................... 524/425, 437, 524/445, 446, 447, 448, 451, 524, 438, 423

[56] References Cited

U.S. PATENT DOCUMENTS

| | | | |
|---|---|---|---|
| 4,010,307 | 3/1977 | Canard et al. | 428/327 |
| 4,379,857 | 4/1983 | Hansen et al. | 521/54 |
| 5,380,779 | 1/1995 | D'Haese | 524/272 |
| 5,654,039 | 8/1997 | Wenzel et al. | 427/391 |

FOREIGN PATENT DOCUMENTS

| | | |
|---|---|---|
| 1267770 | 5/1968 | Germany . |
| 1 583 947 | 6/1976 | United Kingdom . |
| 1583947 | 6/1976 | United Kingdom . |
| 2 039 789 | 11/1979 | United Kingdom . |
| 2039789 | 11/1979 | United Kingdom . |
| WO 93/13264 | 7/1993 | WIPO . |
| WO13264 | 7/1993 | WIPO . |

OTHER PUBLICATIONS

Converting Magazine Aug. 1995, Technical Report pp. 184–185 et seq., The search for alternative moisture–barrier coatings, richard M. Podhajny, Ph.D.

Alince et al., "Flow Behavior of Pigment Blends", *Tappi Journal,* vol. 66, No. 11, Nov. 1983, pp. 57–60. Abstract of Published Japanese Patent Application No. JP 61–36698.

*Primary Examiner*—James J. Seidleck
*Assistant Examiner*—U. K. Rajguru
*Attorney, Agent, or Firm*—Evenson, McKeown, Edwards & Lenahan, P.L.L.C.

[57] ABSTRACT

The composition comprises a polymer emulsion containing, for example, polyvinylidene chloride having a particle size distribution finer than 10μ, and an additive with generally the same size distribution, for example aluminum silicte, calcium carbonate, polyvinyl acetate polystyrene, polyacrylates, in emulsion or powder form which is capable of interstitial combination with the polymer particles. The composition has a critical pH between about 2 and 7. The method of repulping coated packaging is also disclosed.

15 Claims, 4 Drawing Sheets

METHOD AND COMPOSITION FOR PROVIDING REPULPABLE MOISTURE VAPOR BARRIER COATING FOR FLEXIBLE PACKAGING

CROSS-REFERENCE

This application is a continuation-in-part of U.S. Ser. No. 08/375,988, filed Jan. 20, 1995, inventor Serge Bérubé, now abandoned.

BACKGROUND OF INVENTION (a) Field of the Invention

The present invention relates to a method and compositions for providing a repulpable moisture vapor barrier coating for flexible packaging as well as to a flexible packaging provided with such coating. More particularly, the invention is concerned with a method for reprocessing a flexible packaging material having a moisture vapor barrier coating thereon, wherein the coating is permitted to be mixed with cellulose fibers to constitute a pulp, allowing the fibers to be adapted to make up a pulp. The invention is also concerned with a flexible packaging which is provided with a coating enabling it to be reprocessed into valuable paper products.

(b) Description of Prior Art

It is current practice to add a film of polyethylene, a wax coating or a polyvinylidene chloride (PVDC) coating on a paper substrate or between two sheets of paper, the paper substrate and the sheets of paper being referred to as liners, in order to obtain a moisture vapor barrier flexible packaging. Presently, all these moisture barrier coatings are considered to be non repulpable.

Other resins are also used to give flexible packaging materials having a low moisture vapor transmission rate, such as polyacrylates, polyvinyl acetates, and the like. However, for the same barrier performances, they are more expensive than coatings based on wax, polyethylene and polyvinylidene chloride.

Moisture barrier coatings which are present in moisture barrier packaging materials are considered by recycling (repulping) mills to be non-repulpable, mainly because they introduce quality problems in the fiber recovery process, either by upsetting the process (plugging the screen) or by contaminating the finished product.

Presently, more than 20% of all papers and cardboards produced in the world are laminated as indicated above, which give products that are incompatible with the industry of recycling.

One drawback with polyethylene, wax or PVDC coated packaging is that they are difficult to reprocess or recycle and must usually be discarded. The disposal of moisture barrier packaging materials has become an important issue for paper mills and their customers. Repulping (recycling) these materials poses special problems to the industry. The moisture barrier presents a challenge in recovering the useful fiber from these packaging materials, and most recycle mills are unable to overcome the problem of repulping them. Presently, nearly all of these moisture barrier packaging materials are disposed of in landfills and are not repulpable.

On the other hand, reprocessing of wood fiber based packaging constitutes an important source of wood fibers. Furthermore, because of the above difficulties, these materials must usually be discarded and with recent concerns over environmental problems, this is not acceptable. Reprocessing of wood fiber based packaging is an increasingly important source of wood fibers, and the wastage of high quality and costly fibers is no longer tolerable, since the latter represent millions of tons of waste material.

Two methods are normally used for reprocessing wood fibers. The first method involves the breaking up of the source of wood fibers, such as those present in a packaging material, into constituent fibers as a result of repulping, while any other material is screened away by means of conventional equipment. The second method involves the breaking up of the packaging in such a way that any additional material such as a coating would break up into tiny pieces less than 1.6 mm which would pass through the screen with the fibers to constitute a pulp. This second method is normally carried out with additional equipment and/or chemicals, which makes it quite expensive.

Unfortunately, none of the resins of the prior art with or without wax which are used to provide coatings for flexible packaging can be reprocessed without additional manufacturing steps, with the result that recyclability is difficult. In addition, the presence of wax in the moisture vapor barrier coating lowers the usable pulp yield and therefore increases the amount of waste.

In the repulping process, wax based barriers break up into very tiny particles (less than 0.7 mm) which pass through the screen and end up in the pulp which is sent to the paper machine, as well as in the white water. Problems associated with repulping wax based barriers are the following:

the wax particles plug up the felts;

the wax particles gum up the can dryer causing paper breaking;

wax ends up at the surface of the product being made resulting in surface and printing problems and causing stickies in the finished product; and lowering of the usable pulp yield.

On the other hand, when polyethylene is used as the vapor barrier coating, while in the repulper, it breaks up into large pieces of film whose sizes range from about 0.3 cm to 2.5 cm long. Polyethylene causes screen plugging, requires downtime to clean and generate solid waste.

The problems associated with polyvinylidene chloride barrier coatings are generally the same as those found when the barrier coatings are made of polyethylene.

Since PVDC has the advantage of providing a coating with excellent vapor barrier, good oxygen barrier, as well as chemical resistance properties at a relatively low cost, it would be commercially beneficial for the manufacture of paper rolls or the like to be able to rely on a flexible packaging including a PVDC coating that can be completely recycled and reprocessed.

However, with the present state of the art, any attempt to modify the repulpability of PVDC and other types of resins, by adding materials or treating the packaging to increase the hardness of the film, would result in a tremendous loss of the barrier properties, which is of course not acceptable.

Coatings based on PVDC are known, for example as taught in UK 1,583,947 published Feb. 4, 1981, inventor Frederic Douglas Hough. However, these coatings are used on paper to produce a transfer sheet. The Patent is mute with respect to the recycling of this coated paper, and gives no directive to produce a coating which can be repulped along with the paper fibers.

UK 2,039,789 published Aug. 10, 1980, inventor Adrian Neville Fellows, describes the preparation of a dielectric coating from a dispersion of an electrically insulating polymer and a water dispersible smectite clay. There is no teaching in this Patent of providing a coating which is characterized by being water vapor impermeable, while being repulpable when broken into a pulp mixture.

Richard M. Podhajny in "The Search for Alternative Moisture-Barrier Coatings", Converting Magazine®, August 1995, suggest that alternatives to PVDC are urgently needed because of the polluting character of PVDC when allowed to be disposed in waste stream. In spite of the fact that PVDC coatings, with or without additives, are known, it will thus appear that a suitable formulation wherein the coating will remain with the pulp when recycling and therefore will not pollute the environment, has not yet been achieved.

At the present rate, it will not be possible to maintain the traditional rate of supplying paper source from forests, and means will have to be found to obtain sufficient fibers to meet the demand.

SUMMARY OF INVENTION

It is therefore an object of the present invention to provide a modified repulpable moisture vapor barrier polyvinylidene chloride coating for flexible packaging which would give recyclable and/or screenable packaging, and which constitutes an excellent moisture vapor barrier and oxygen barrier, has excellent chemical resistance properties and which provides excellent bond strength for paper lamination.

It is another object of the present invention to provide a modified repulpable polyvinylidene chloride coating which, when applied to paper or liner board, provides an adequate moisture vapor barrier and does not interfere with the repulping process, the paper machine or the finished product.

It is another object of the present invention to provide a modified repulpable polyvinylidene chloride coating which, upon repulping, will break up into small pieces, preferably smaller than 1.6 mm and will defiber very easily thereby minimizing the amount of rejects.

It is yet another object of the present invention to provide a moisture vapor barrier coating which when broken up will give particles that will pass through the screen and will be dispersed within the fibers.

It is yet another object of the invention to provide a modified repulpable polyvinylidene chloride coating that does not generate solid waste upon recycling, which does not dissolve in process water and does not contribute to BOD (biological oxygen demand) in the effluent, and which produces particles that are inert and are not reactivated by heat.

It is another object of the present invention to provide a commercially feasible modified repulpable barrier coating, such as one based on PVDC, and which has generally the same barrier properties and at least nearly the same adhesion on paper as non-modified barrier coating, and which, in addition to being easily recovered, is repulpable at low cost.

It is yet another object of the present invention to provide a coating composition for flexible packaging having improved current rheology so as to improve the flow properties and to prevent the coating from penetrating into porous papers such as is the case with the low shear viscosity PVDC currently used.

It is another object of the present invention to provide a barrier coating which does not require the use of complex equipment which implies an associated chemical treatment when recovering virgin fibers.

It is another object of the present invention to provide a flexible barrier coating which can be laminated on a paper base layer without using glue.

In accordance with the invention there is provided a composition for providing a repulpable moisture vapor barrier for flexible packaging material, which comprises a polymer emulsion wherein the polymer in the emulsion has a mean particle size distribution finer than about $10\mu$ and an additive consisting of a particulate material having a mean particle size distribution finer than about $10\mu$ and which is capable of interstitial combination with the polymer particles and of giving a coating on the flexible packaging material which preserves the moisture vapor barrier properties provided by the polymer and which upon repulping breaks up into pieces generally smaller than a about 1.6 mm. The pH of the composition should be such as to enable the coating to break up into pieces generally smaller than 1.6 mm.

Also according to the invention, there is provided a method for reprocessing a flexible paper packaging material having a moisture vapor barrier coating thereon, wherein the packaging material is broken up into constituent fibers and particles of coating. According to the method of the invention, the coating comprises a mixture containing polyvinylidene chloride and an additive in particulate form which is capable of interstitial combination with particles of polyvinylidene chloride and of giving a coating on the flexible paper packaging material which preserves moisture vapor barrier properties provided by the polyvinylidene chloride. The method includes breaking up the packaging material including the coating into particles of which at least about 95% are generally smaller than 1.6 mm, screening and separating any particles larger than 1.6 mm, and producing a pulp from the remaining particles.

Although many polymers could be used to produce the vapor barrier coating according to the invention, as it is well known to those skilled in the art, preferred polymers include polyvinylidene chloride, a copolymer of vinylidene chloride, methyl methacrylate and acrylonitrile, or mixtures thereof.

Similarly with respect to the additive, the preferred ones are hydrated aluminum silicate, calcium carbonate, a polyvinyl acetate homopolymer, and mixtures thereof.

In practice, the most interesting polymer emulsion comprises polyvinylidene chloride.

The preferred polymer in the polymer emulsion is polyvinylidene chloride (PVDC) which constitutes an excellent barrier against humidity since its molecular structure enables to provide crystalline regions in which the polymer chains are aligned and arranged in an orderly manner. As discussed in "The Search for Alternative Moisture-Barrier Coatings", Converting Magazine®, August 1995, strong and interactive bonds are formed in these chains. The interactions between H and Cl atoms are responsible for the strong attractions between chains of PVDC, forming a dense, tridimensional crystalline network.

When repulping in a standard crusher, the mechanical force applied on the coating is not sufficient to break the bonds between these chains and produce particles smaller than 1.6 mm, since the particles obtained are normally larger than 6 mm.

By adding selected additives to PVDC such as hydrated aluminum silicate and calcium carbonate with a mean particle size smaller than about $10\mu$, and choosing a critical pH, crystallinity still remains in the composition, but crushing remains possible to produce smaller particles because of the presence of the additives.

As mentioned above, the pH of the solution is critical. For example, with hydrated aluminum silicate, the pH must generally be lower than or equal to about 2. With calcium carbonate, the pH should normally be between 6 and 7. Typically the pH is between about 2 and 8.

Obviously, too large a concentration of additives would rapidly lower the resistance to humidity of the vapor barrier formed. It has been found that particles with desired fineness can still be produced when polyvinyl acetate is used as additive. This additive is not as good as hydrated aluminum silicate or calcium carbonate to provide a good repulpable mixture, however, it has less negative effect on the impermeability of the vapor barrier coating. On the other hand, the combined use of polyvinyl acetate and calcium carbonate gives excellent results in terms of repulpability and impermeability. Other additives which give satisfactory results include emulsions of polystyrene, polyacrylate, and the like.

DESCRIPTION OF DRAWINGS

The invention is illustrated by means of the annexed drawings, it being understood that the invention is not limited thereto. In the drawings.

DESCRIPTION OF PREFERRED EMBODIMENT

Figure 1:
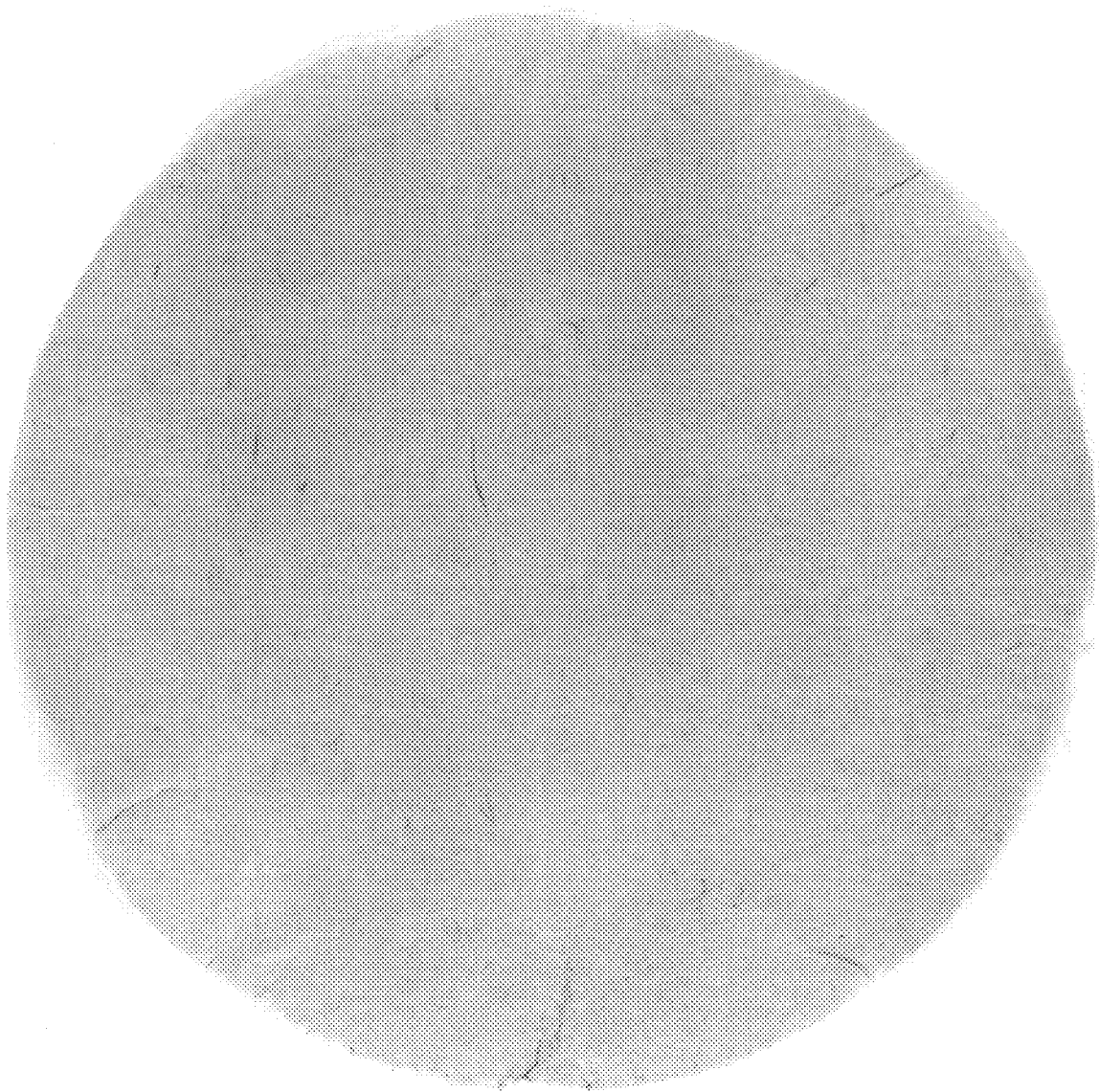
FIG. 1 represents a paper obtained using virgin cellulose fibers.
Figure 2:
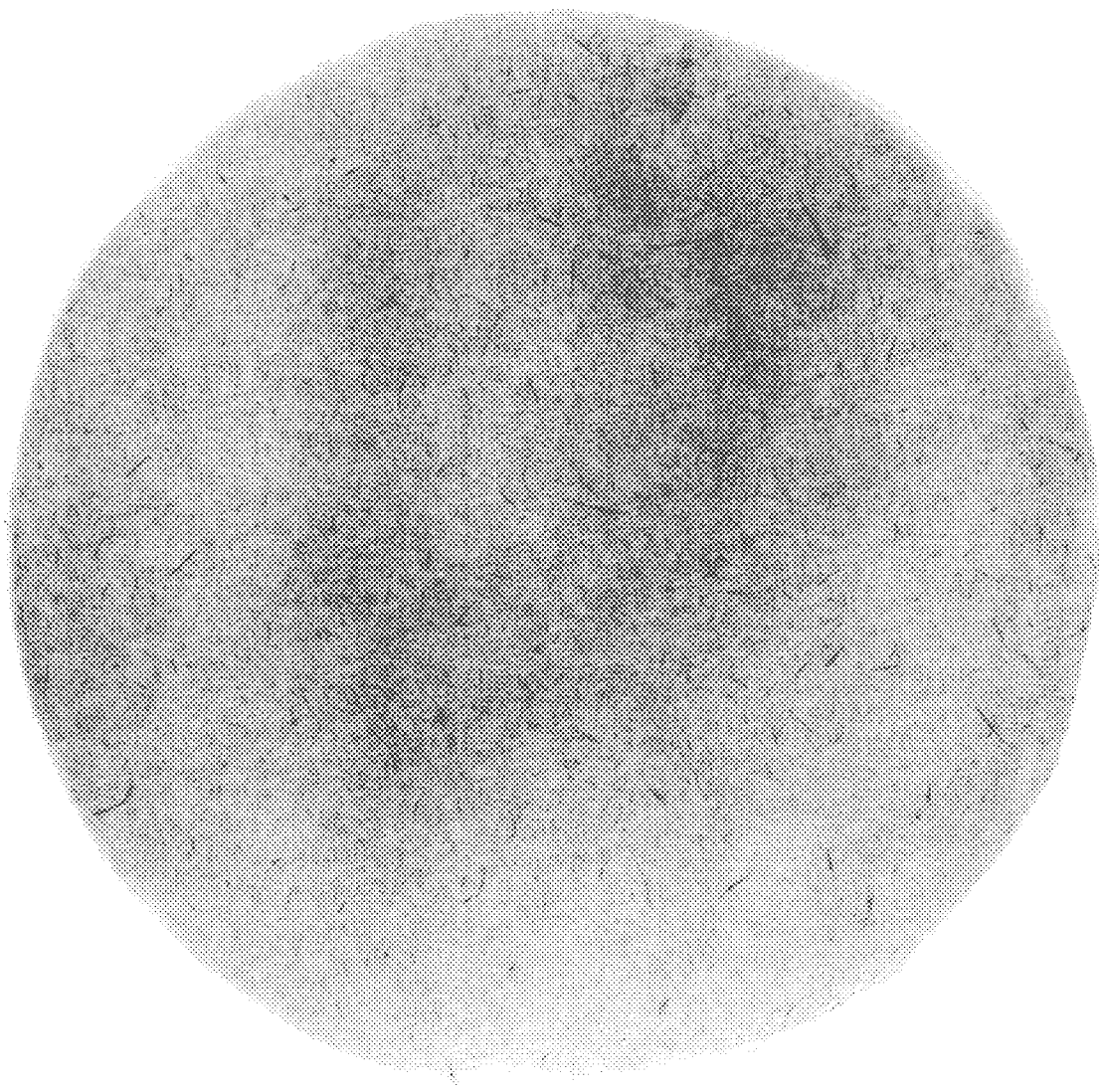
FIG. 2 represents a paper obtained by repulping a flexible packaging having a vapor barrier according to the invention.
Figure 3:
FIG. 3 Represents a paper as in FIG. 1 wherein the vapor barrier is PVDC.
Figure 4:
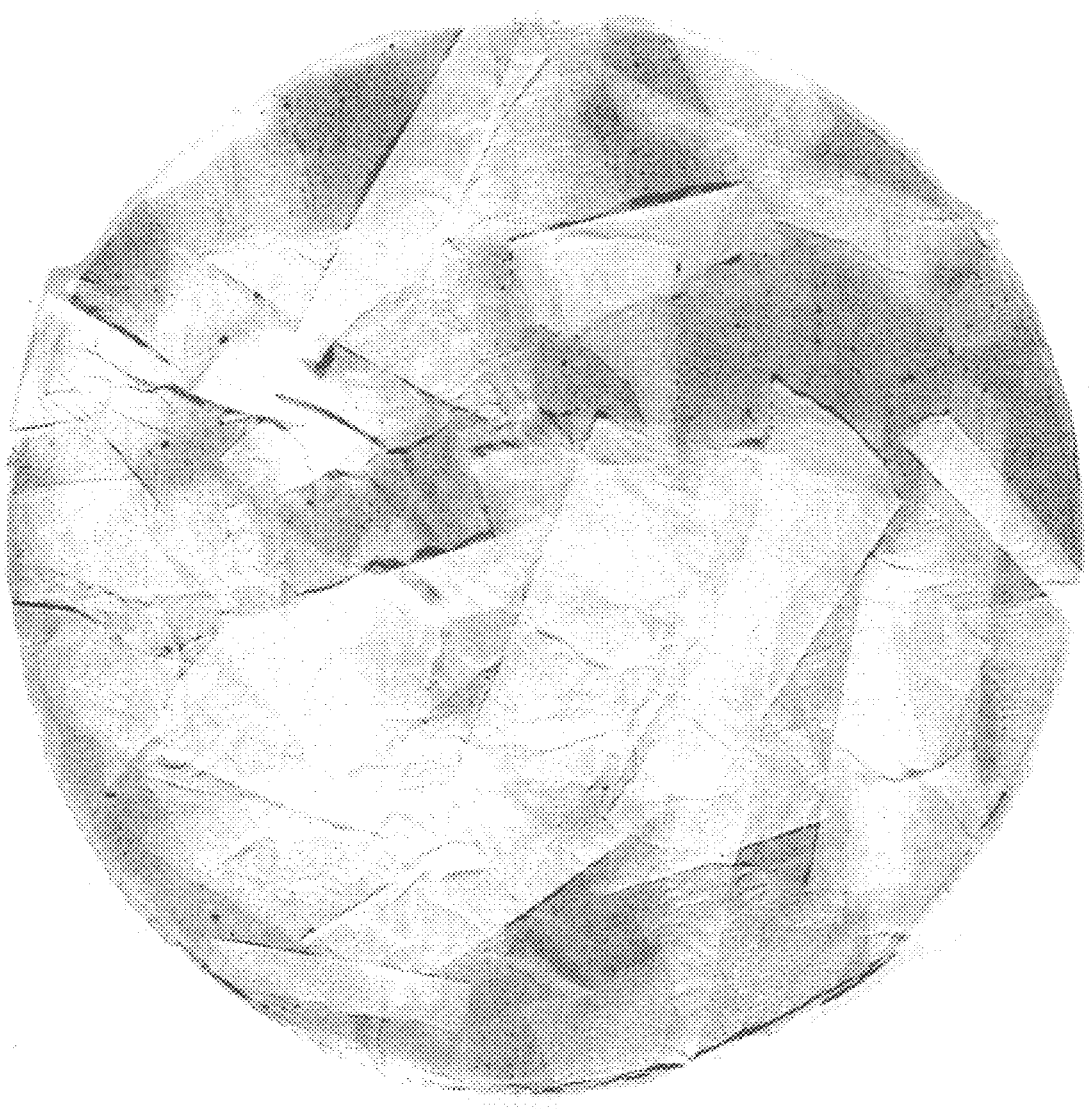
FIG. 4 represents a paper as in FIG. 1 wherein the vapor barrier is polyethylene.

It will readily be seen that in practice, the coating of the prior art is not repulpable while the present invention provides a paper, which is substantially the equivalent of one produced with virgin fibers.

The invention is further illustrated by means of the following examples:

EXAMPLE 1

The coating composition is prepared by mixing 80 parts of a polyvinylidene chloride emulsion sold under the trademark SERFENE 2022 with 20 parts of a hydrated aluminum silicate slurry sold under the trademark OMNIFIL. The pH of the mixture which contained 54.5% solid material was adjusted to 2.1 and a coating using the mixture was formed on a flexible packaging paper product. Repulping breaks up the coated product into particles smaller than 1.5 mm, which in practice enables all the coating to be repulped.

MVTR (moisture vapor transmission rate, 100% R.H., 37.8° C.) 25 g/m$^2$ of coating on liner board: 15. g/m$^2$/day.

EXAMPLE 2

Example 1 was repeated except the OMNIFIL was replaced by 10 parts of calcium carbonate sold under the trademark PULPRO 3 and 10 parts of a polyvinyl acetate homopolymer sold under the trademark DARATACK 7IL. The pH was adjusted to 6.2. The mixture contained 55.7% solid material. Repulping resulted in particles smaller than 1.2 mm.

MVTR: 4 g/m$^2$/day.

EXAMPLE 3

Example 1 was repeated except that 66 parts of SERFENE 2022 were used with 27 parts of DARAN SLI 12®, which is a copolymer of vinylidene chloride, methyl methacrylate and acrylonitrile, and 7 parts of DARATACK 7IL. The pH was adjusted to 2.1. The mixture contained 51.5% solid material. Repulping resulted in particles smaller than 1.5 mm.

MVTR: 1.5 g/m$^2$/day.

EXAMPLE 4

Example 1 was repeated except that 85 parts of SERFENE 2022 were used with 15 parts of DARATACK 7IL. The pH was adjusted to 2.1 and the mixture contained 50.8% solid material. Repulping resulted in particles smaller than 1.5 mm, which enabled all the coatings to be repulped.

MVTR: 4 g/m$^2$/day.

EXAMPLE 5

Example 1 was repeated except that 75 parts of SERFENE 2022 were used with 15 parts PULPRO 8 (trademark for particulate calcium carbonate somewhat coarser than PULPRO 3), and 10 parts DARATACK 7IL. The pH was adjusted to 6.2 and the mixture contained 58% solid material repulping resulted in particles smaller than 1.5 mm.

MVTR: 8 g/m$^2$/day.

EXAMPLE 6

Example 1 was repeated except that 75 parts of SERFENE 2022 were used with 11 parts of PULPRO 8 and 14 parts of LYTRON 604 (trademark for an emulsion of uniform, hard, lightweight, spherical, polystyrene polymer particles). The pH of the mixture was 6.1 and contained 54% solid material. Repulping resulted in particles smaller than 1.6 mm.

MVTR: 5 g/m$^2$day.

It will therefore be seen that in all examples, the particles are equivalent in size to virgin fibers which means that they can easily be reprocessed and that the moisture vapor transmission rate is in practice equivalent to that of PVDC.

Tests made with paper coated with a composition according to the invention showed that repulping gives about 97% particles smaller than 1.6 mm after 30 minutes of repulping.

Obviously, modifications are possible as it will readily appear to one skilled in the art without departing from the scope and spirit of the present invention, except as defined in the appended claims.

I claim:

1. A composition for providing a repulpable moisture vapor barrier coating for flexible packaging material, which comprises:

a wax-free polymer emulsion having a pH of between about 2 and 8 and wherein said polymer in said emulsion has a particle size distribution finer than about 10$\mu$, said polymer having moisture vapor barrier properties;

an additive consisting of particulate material selected from calcium carbonate, vinyl acetate polymer, and mixtures thereof, and having a mean particle size smaller than about 10$\mu$, said particulate material being capable of interstitial combination with said polymer particles and of giving a coating on said flexible packaging material which preserves moisture vapor barrier properties provided by said polymer, and which upon repulping of the coated flexible packaging breaks up into pieces generally smaller than about 1.6 mm.

2. Composition according to claim 1, wherein said polymer is selected from the group consisting of polyvinylidene chloride, a copolymer of vinylidene chloride, methyl methacrylate and acrylonitrile, and mixtures thereof.

3. The composition according to claim 1, wherein said polymer is polyvinylidene chloride.

4. Composition according to claim 3, wherein said additive comprises calcium carbonate, said pH being between about 6 and 7.

5. Composition according to claim 3, wherein said additive comprises a polyvinyl acetate homopolymer, said pH being about 2.0.

6. A composition for providing a repulpable moisture vapor barrier coating for flexible packaging material, which comprises:

a wax-free polymer emulsion containing polyvinylidene chloride, wherein said polyvinylidene chloride has a mean particle size distribution finer than about $10\mu$;

an additive containing an emulsion of particulate hydrated aluminum silicate having a mean particle size distribution finer than about $10\mu$;

said composition having a pH of about 2.0;

said particulate hydrated aluminum silicate being capable of interstitial combination with particles of said polyvinylidene chloride and of giving a coating on said flexible packaging material which preserves moisture vapor barrier properties provided by said polyvinylidene chloride, and which upon repulping breaks up into pieces generally smaller than about 1.6 mm.

7. A composition for providing a repulpable moisture vapor barrier coating for flexible packaging material, which comprises:

a wax-free polymer emulsion containing polyvinylidene chloride, wherein said polyvinylidene chloride has a mean particle size distribution finer than about $10\mu$;

an additive containing calcium carbonate having a mean particle size distribution finer than about $10\mu$;

said composition having a pH of about 6.0;

said particulate calcium carbonate being capable of interstitial combination with particles of said polyvinylidene chloride and of giving a coating on said flexible packaging material which preserves moisture vapor barrier properties provided by said polyvinylidene chloride, and which upon repulping breaks up into pieces generally smaller than about 1.6 mm.

8. Composition according to claim 7, wherein said additive additionally contains a vinyl acetate polymer having substantially the same mean particle size distribution as said calcium carbonate.

9. A composition for providing a repulpable moisture vapor barrier coating for repulpable wood-fiber based packaging, which comprises:

a wax-free polyvinylidene chloride emulsion wherein the polyvinylidene chloride has moisture vapor barrier properties and is present as polyvinylidene chloride particles having a mean particle size distribution finer than about $10\mu$;

said emulsion containing an additive consisting of polymer particles having a mean particle size distribution finer than about $10\mu$, said polymer particles being capable of interstitial combination with the polyvinylidene chloride particles to form a coating on said wood-fiber based packaging in which the moisture vapor barrier properties of the polyvinylidene chloride are preserved, wherein said coating, on repulping of the coated wood-fiber based packaging, breaks up into pieces smaller than about 1.6 mm, wherein said coating composition has a pH of between about 2 and 8.

10. The composition according to claim 9, wherein said polymer particles comprise styrene polymer particles.

11. The composition according to claim 9, wherein said polymer particles comprise vinyl acetate polymer particles.

12. A repulpable moisture vapor barrier coating composition for repulpable wood-fiber based packaging, consisting essentially of:

a wax-free polyvinylidene chloride emulsion, wherein the polyvinylidene chloride in the emulsion has a molecular structure that enables provision of crystalline regions and moisture vapor properties, and wherein polymer chains of the polyvinylidene chloride are arranged with interactive bonds between the polymer chains, said polyvinylidene chloride being present in said emulsion as particles having a mean a particle size distribution finer than about $10\mu$, said emulsion containing an additive consisting of polymer particles having a mean particle size distribution finer than about $10\mu$, said polymer particles being capable of interstitial combination with the polyvinylidene chloride particles to form a coating on said wood-fiber based packaging in which the moisture vapor barrier properties of the polyvinylidene chloride are preserved, wherein said polyvinylidene chloride emulsion, in the absence of said additive, forms a moisture vapor barrier coating on said wood-fiber based packaging, which in repulping of the coated packaging produces coating particles larger than 1.6 mm, in which the interactive bonds between the polymer chains and maintained, and which particles do not form a pulp with the repulped wood-fiber, wherein said polyvinylidene chloride emulsion containing said additive forms a moisture vapor barrier coating on said wood-fiber based packaging, which on repulping of the coated packaging breaks up into coating particles smaller than about 1.6 mm, which form a pulp with the repulped wood fiber, and wherein said coating composition has a pH between about 2 and 8.

13. The composition according to claim 12, wherein said polymer particles comprise vinyl acetate polymer particles.

14. The composition according to claim 12, wherein said polymer particles comprise styrene polymer particles.

15. The composition according to claim 12, wherein the repulping of the coated packaging having a moisture vapor barrier coating, in the absence of said additive, produces coating particles larger than 6 mm.

* * * * *